United States Patent
Davis et al.

(10) Patent No.: US 7,110,774 B1
(45) Date of Patent: Sep. 19, 2006

(54) DUAL MODE UPLINK/DOWNLINK LOCATION MEASUREMENT AND MULTI-PROTOCOL LOCATION MEASUREMENT

(75) Inventors: Gregory G. Davis, Monument, CO (US); Richard C. Stribling, Colorado Springs, CO (US); Randy L. Engle, Colorado Springs, CO (US); Richard M. Nelhams, Monument, CO (US)

(73) Assignee: Intel Corporation, Santa Clara, CA (US)

( * ) Notice: Subject to any disclaimer, the term of this patent is extended or adjusted under 35 U.S.C. 154(b) by 955 days.

(21) Appl. No.: 09/698,536

(22) Filed: Oct. 27, 2000

(51) Int. Cl.
*H04Q 7/20* (2006.01)

(52) U.S. Cl. ............... 455/456.1; 455/456.5; 455/456.6; 342/450; 342/463

(58) Field of Classification Search ............ 455/456.1, 455/456.5–456.6, 426.1; 342/357.11, 463, 342/464, 457, 450
See application file for complete search history.

(56) References Cited

U.S. PATENT DOCUMENTS

| | | | |
|---|---|---|---|
| 4,855,962 A | | 8/1989 | Regnaudin et al. |
| 5,408,680 A | * | 4/1995 | Hattey et al. .................. 455/15 |
| 5,760,743 A | * | 6/1998 | Law et al. .................. 342/458 |
| 5,818,385 A | * | 10/1998 | Bartholomew .............. 342/372 |
| 5,959,580 A | | 9/1999 | Maloney et al. |
| 6,026,305 A | * | 2/2000 | Salinger et al. .......... 455/456.3 |
| 6,032,209 A | * | 2/2000 | Mros et al. .................. 710/302 |
| 6,125,125 A | | 9/2000 | Narasimha et al. |
| 6,184,829 B1 | * | 2/2001 | Stilp .......................... 342/387 |
| 6,204,812 B1 | | 3/2001 | Fattouche |
| 6,208,297 B1 | | 3/2001 | Fattouche |
| 6,263,391 B1 | * | 7/2001 | Pecone et al. .............. 710/313 |
| 6,266,014 B1 | | 7/2001 | Fattouche |
| 6,282,427 B1 | * | 8/2001 | Larsson et al. .......... 455/456.2 |
| 6,295,455 B1 | * | 9/2001 | Fischer et al. ........... 455/456.2 |
| 6,314,535 B1 | * | 11/2001 | Morris et al. ................ 714/708 |
| 6,385,452 B1 | * | 5/2002 | Zadeh et al. ................. 455/440 |
| 6,408,246 B1 | * | 6/2002 | Fox ............................ 701/300 |
| 6,522,887 B1 | * | 2/2003 | Larsson et al. .......... 455/456.5 |
| 6,526,039 B1 | * | 2/2003 | Dahlman et al. ........... 370/350 |
| 6,529,165 B1 | * | 3/2003 | Duffett-Smith et al. ..... 342/463 |
| 6,603,976 B1 | * | 8/2003 | Amirijoo et al. ........ 342/357.1 |
| 6,606,501 B1 | | 8/2003 | Saha et al. |
| 6,665,540 B1 | * | 12/2003 | Rantalainen et al. .... 455/456.5 |

(Continued)

FOREIGN PATENT DOCUMENTS

DE         1240146         3/1963

(Continued)

OTHER PUBLICATIONS

Drane et al., "Positioning GSM Telephones", Apr. 1998 IEEE Communication Magazine, pp, 46-59.

(Continued)

*Primary Examiner*—George Eng
*Assistant Examiner*—Marcos L Torres
(74) *Attorney, Agent, or Firm*—Blakely, Sokoloff, Taylor & Zafman LLP

(57) ABSTRACT

Certain aspects of the disclosure relate to combining uplink and downlink location technologies into a single location-service system, to obtain the benefits offered by both of technologies while eliminating many of their individual shortcomings. Mobile devices that support downlink can then be located using the downlink mode, and mobile devices that do not support downlink can be located using the uplink mode. A mobile device may even be located based on a combination of uplink measurements and downlink measurements. Other aspects of the disclosure relate to providing a single location-service system to locate mobile devices that communicate using a plurality of different communication protocols.

28 Claims, 8 Drawing Sheets

U.S. PATENT DOCUMENTS

2001/0041575 A1 * 11/2001 Amirijoo et al. ........... 455/456
2002/0065075 A1     5/2002 Kangas et al.
2003/0146871 A1 *  8/2003 Karr et al. .................. 342/457

FOREIGN PATENT DOCUMENTS

| DE | 19907024 | 2/1999 |
| --- | --- | --- |
| DE | 19948556 | 10/1999 |
| DE | 10196828 | 7/2004 |
| EP | 0600796 | 12/1993 |
| EP | 0767594 S2 | 4/1997 |
| EP | 10 30531 A | 8/2000 |
| WO | WO 98/48588 | 10/1998 |
| WO | WO 99 15911 A | 4/1999 |
| WO | WO 99/030181 A1 * | 6/1999 |
| WO | WO 99/049691 A * | 9/1999 |
| WO | WO 99 49691 A2 | 9/1999 |
| WO | WO 00/41417 | 7/2000 |

OTHER PUBLICATIONS

PCT Search Report, PCT/US01/47005, Feb. 26, 2003, 4 pages.
Sunay et al., "Mobile Location Tracking in DS CDMA Networks Using Forward Link Time Difference of Arrival . . . " Global Tele. Conference Globecom, 1999, pp. 143-147, no month listed.
Sunay et al., "Mobile Location Tracking in DS CDMA Networks Using Foward Link Time Difference of Arrival . . . ", Global Tele. Conference Globecom, 1999, pp. 143-147, no month listed.

* cited by examiner

DUAL MODE UPLINK/DOWNLINK LOCATION MEASUREMENT AND MULTI-PROTOCOL LOCATION MEASUREMENT

BACKGROUND OF THE INVENTION

1. Field of the Invention

The field of the present invention relates to location services. More particularly, the field of the present invention relates to locating a mobile device by noting times of arrival of signals that travel between the mobile device and a plurality of transmitters or receivers located at known positions, and computing a location based on the noted times of arrival.

2. Background

Recently, the FCC mandated the introduction of location services that can accurately locate wireless subscribers on all wireless networks. Two previously proposed approaches for implementing such location services are the "uplink" approach and the "downlink" approach.

FIG. 1 depicts a conventional uplink approach, where the mobile device 10 (also referred to as a "handset" or "remote terminal") that is to be located sends out a signal such as a random access channel (RACH) burst. The time of arrival (TOA) of the signal is determined at each of a plurality of location measurement units (LMUs) 15–17, together with an associated quality indicator $\sigma$. This $\sigma$ is an estimate of the standard deviation of the TOA measurement. Each of these noted TOA measurements and $\sigma$s is then sent to a mobile location center (MLC) 19, which is a special purpose processor. The MLC 19 then uses conventional algorithms, which are well known to those skilled in the art, to determine the location of the mobile device 10 based on the TOA measurements and $\sigma$ determinations made by the LMUs 15–17 and the known location of the LMUs.

One suitable conventional location algorithm uses a Taylor search to locate the intersection of two or more hyperbolas. Details of a such an algorithm can be found in "Statistical Theory of Passive Location Systems" by D. J. Torrieri, IEEE Transactions on Aerospace and Electronic Systems, Vol. AES-20, No. 2, March 1984, which is incorporated herein by reference and is an indication of the existing level of skill in the art. This algorithm locates the mobile device by finding the intersection of two or more hyperbolas determined from three or more stations. Ordinarily, this type of location algorithm is applied to three or more TOA measurements (which are used to determine the distance from the mobile device to the LMU based on the speed c of the signal), the associated $\sigma$s, and the known locations of each LMU.

FIG. 2 depicts a conventional downlink approach, where each of a plurality of base stations (BTSs) 21–23 sends a signal to the mobile device 20 to be located, and the mobile device 20 determines the TOA and $\sigma$ of each of these signals. These TOA measurements and $\sigma$s are then transmitted to an MLC 29, which implements a conventional algorithm to determine the mobile device's location based on the TOA measurements and the $\sigma$s, similar to the algorithm in the uplink type systems. Alternatively, if sufficient processing power is available in the handset 20, the algorithm may be implemented in the handset. When the transmission frames of the BTSs 21–23 are not synchronized, the downlink algorithms are somewhat more complex than the uplink algorithms because the MLC must obtain the relative time difference between each BTS transmission to calculate a location. This relative time information can be obtained using LMUs 25, 26 located at known locations to measure the TOAs of the signals from the BTSs 21–23, in a conventional manner.

One advantage of downlink location systems over uplink systems is that extra downlink handsets can be added onto a communication network without adding extra capacity to the network. Another advantage of downlink systems is that the required LMU density is lower for downlink systems, because downlink LMUs are only needed to synchronize the frames between the BTSs, and not to make TOA measurements of signals arriving from multiple handsets. But in order to implement downlink location services, TOA measurements must be made in the handset. Unfortunately, most handsets already released in the field (hereinafter "legacy handsets") cannot implement the TOA measurements required for downlink location estimation. As a result, these legacy handsets cannot be located by a downlink system. This inability to locate the vast majority of existing handsets is a major shortcoming of downlink systems.

Another shortcoming of conventional locations systems is that each conventional system only works using a single communication protocol, and cannot locate handsets that use different communication protocols. For example, a location system designed to locate TDMA handsets will not be able to locate handsets that communicate using GSM or AMPS. Because location services must be provided for all types of handsets, the conventional approach for supporting all communication protocols would involve a separate location system for each protocol, and a correspondingly expensive infrastructure.

In addition to the high monetary cost of providing a separate location service infrastructure for each of the various technologies, there may also be high costs from a community relations standpoint. Some homeowners try to block carriers' plans to install antenna towers near their homes. As a result, a carrier may have to spend upwards of $50,000 to obtain approval for a single antenna site, and may have to wait a long time to obtain the required administrative approval. When separate infrastructures are installed for each technology, these problems may be encountered over and over with each new installation.

The inventors have recognized a need to obtain the benefits of downlink location services while avoiding the shortcomings of downlink.

The inventors have also recognized a need to provide location services for handsets that use many different communication protocols, without using a prohibitively expensive infrastructure.

SUMMARY OF THE INVENTION

Certain aspects of the present invention relate to combining uplink and downlink technologies into a single location system, to obtain the benefits offered by both of these technology and to eliminate many of their individual shortcomings. Other aspects of the present invention relate to combining location services for different communication protocols into a single system.

One aspect of the present invention is directed to a method of locating mobile devices using either uplink or downlink technology. This method includes the steps of locating a first mobile device by determining when a signal from the mobile device reaches each of at least three measurement units, and computing a location based on the times of arrival. This method also includes the steps of locating a second mobile device by determining when signals from at least three base stations reach the second mobile device, by determining when those signals reach the measurement units, and computing a location based on these determinations.

Another aspect of the present invention is directed to a method of locating a mobile device using both uplink and downlink technologies. This method includes steps of determining at least two times of arrival for uplink signals, determining at least two times of arrival for downlink signals, and computing a location of the mobile device based on these times of arrival. In certain embodiments, the uplink times are used to define first hyperbola, the downlink times are used to define a second hyperbola, and the location is computed by finding the intersection of these hyperbolas.

Another aspect of the present invention is directed to a system for determining the location of a mobile device in either an uplink mode or a downlink mode. The system includes an uplink processor and a downlink processor, at least three base stations that communicate with the mobile device, and at least three measurement units. In the uplink mode, the measurement units determine the TOA of a signal that originated from the mobile device, and report the TOA measurements to the uplink processor. The uplink processor determines the location of the mobile device based on the TOA measurements. In the downlink mode, the mobile device determines times of arrival of signals arriving from each of the base stations and reports the determined times of arrival to the downlink processor. The measurement units collectively determine a time of arrival of signals that originated from the base stations and report those TOA measurements to the downlink processor. The downlink processor determines the location of the mobile device based on the TOA measurements reported by the mobile device and by the measurement units. Optionally, multiple communication protocols may be supported (e.g., both TDMA and GSM).

Another aspect of the present invention is directed to an apparatus for use as a part of a communication system, where the communication system includes a mobile device, a plurality of base stations, an uplink processor, and a downlink processor. The apparatus includes a receiver that notes a TOA of a first signal arriving from the mobile device, and forwards this noted TOA to the uplink processor. The receiver also notes a TOA of a second signal arriving from the base station, and forwards this noted TOA to the downlink processor. Optionally, multiple communication protocols may be supported.

DETAILED DESCRIPTION OF THE PREFERRED EMBODIMENTS

Figure 1:
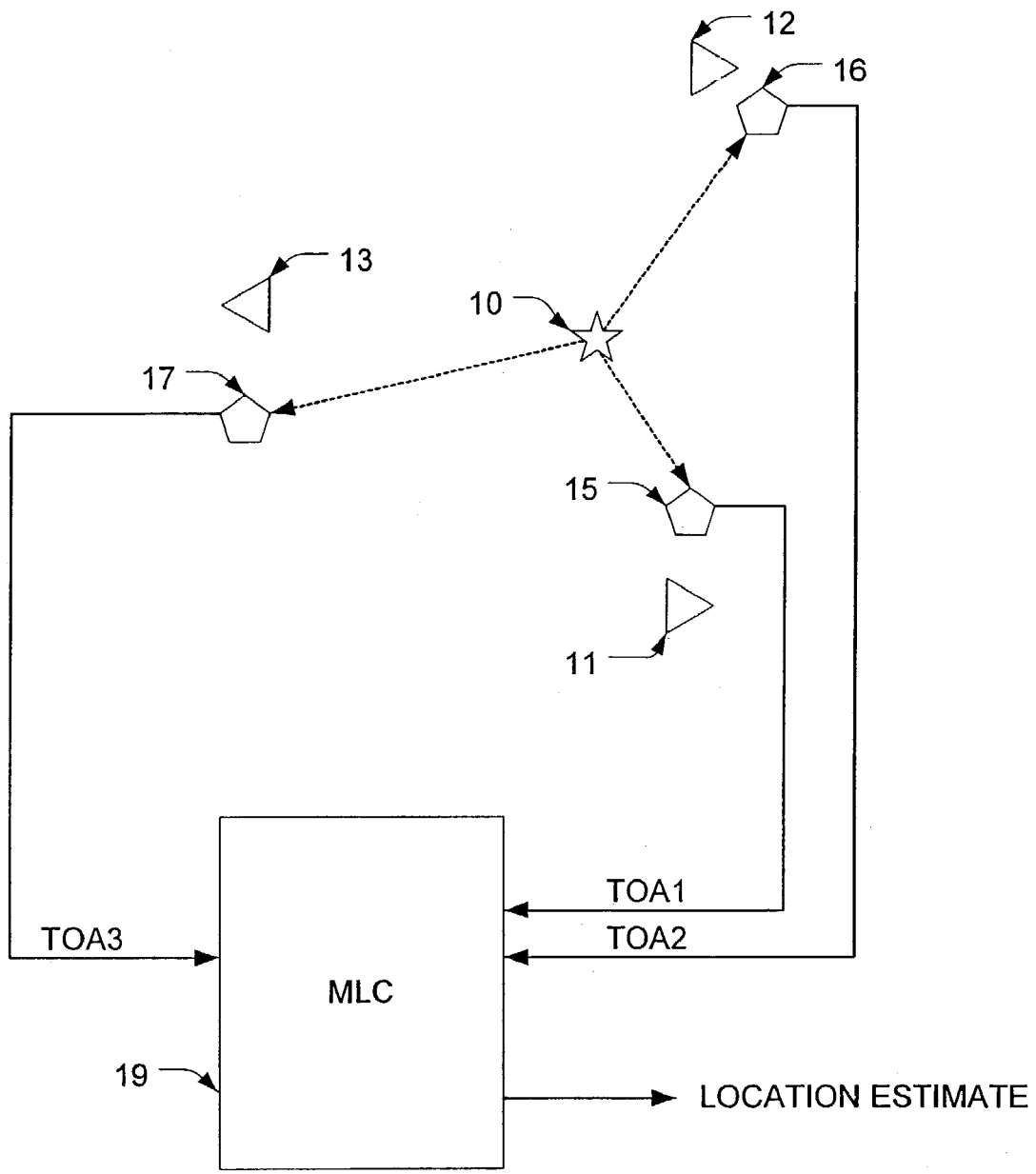
FIG. 1 is a schematic illustration of a prior art uplink type location system.
Figure 2:
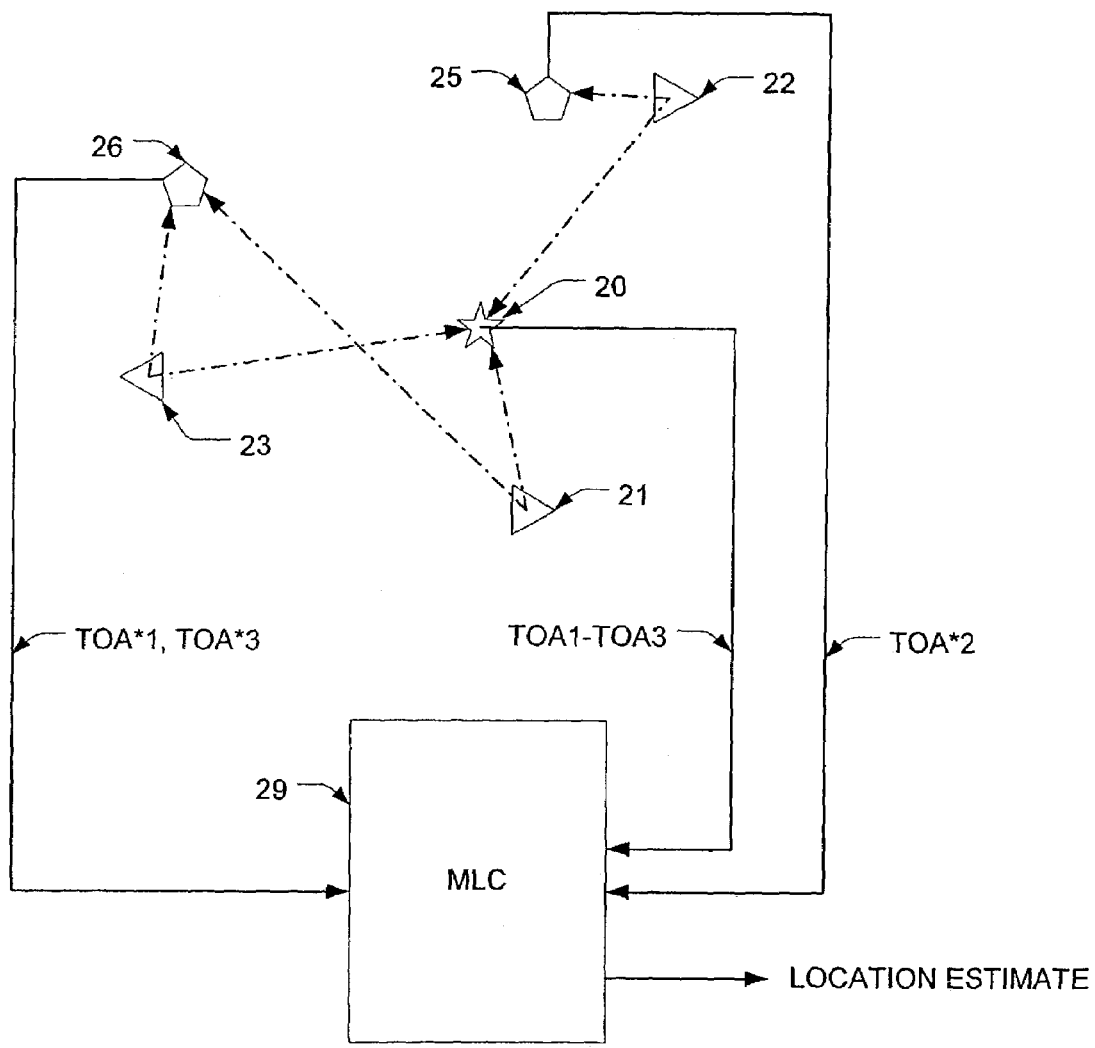
FIG. 2 is a schematic illustration of a prior art downlink type location system.
Figure 3:
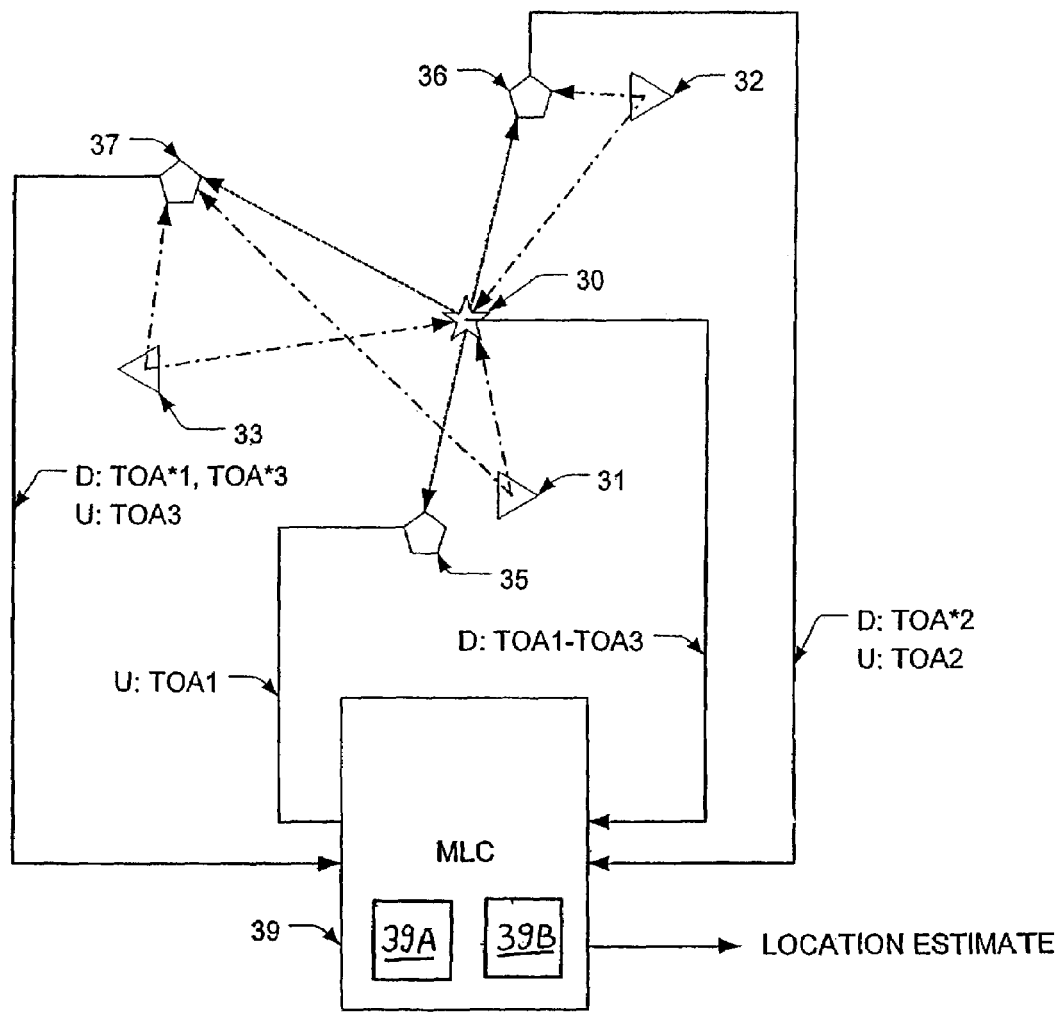
FIG. 3 is a schematic illustration of a dual mode uplink/downlink location system in accordance with the present invention.

FIG. 3 illustrates a system in which a mobile device 30 (e.g., a cell phone) can be located using either an uplink or a downlink approach. In FIG. 3, signal flow in the uplink mode is indicated with a prefix of "U:", and signal flow in the downlink mode is indicated with a prefix of "D:". Signals may be transmitted between the various system components using any desired communications standard (including, for example, ANSI-136 TDMA, AMPS, GSM, GSM 900, DCS 1800, PDC, PCS 1900, iDEN, etc.).

The system relies on a set of at least three dual-purpose LMUs 35–37, which can measure the TOA of signals arriving from the mobile device 30 as well as signals arriving from the base stations 31–33. These LMUs 35–37 are preferably permanently fixed to the earth at known reference locations, but may also be temporarily fixed in position (e.g., on a truck at a known reference location). It should be noted that while only three BTSs 31–33 and three LMUs 35–37 are illustrated, a larger number of BTSs and LMUs (e.g., 7) may be used to provide improved accuracy, as will be appreciated by persons skilled in the art.

To locate the mobile device 30 using the uplink approach, each of the LMUs 35–37 listens for a signal from the mobile device 30 such as a random access channel (RACH) burst. When the signal from the mobile device 30 arrives, each of the LMUs 35–37 determines the TOA of the arriving signal, together with an associated quality indicator ($\sigma$) A global positioning satellite (GPS) based time reference may be used at each LMU to synchronize each TOA measurement to a common frame of reference. Each LMU then forwards its TOA measurement and $\sigma$ to a MLC 39 using a suitable communication link (e.g., a hard-wired or wireless communication link). The MLC 39 includes an uplink processor 39A that is programmed to implement a conventional uplink location algorithm. After receiving the TOA measurements (and associated as) from each of the LMUs 35–37, the MLC 39 implements the uplink algorithm to determine the location of the mobile device 30 based on the received TOA measurements and $\sigma$s, and the known location of the LMUs.

To locate the mobile device 30 using the downlink approach, the system has each of at least three BTSs 31–33 send a signal (e.g., a broadcast control channel (BCCH) signal) to the mobile device 30. When the signals from the BTSs 31–33 arrive, the mobile device 30 determines the TOA of the arriving signals, together with an associated quality indicator ($\sigma$) for each arriving signal. The mobile device 30 then forwards the TOA information to the MLC 39, preferably over the same wireless network being used to communicate with the mobile device 30. The MLC 39 includes a downlink processor 39B that is programmed to implement a conventional downlink location algorithm. While the uplink processor 39A and the downlink processor 39B are illustrated as two distinct blocks, they may actually be integrated together by running different algorithms on a single processor.

In the meantime, each of the LMUs 35–37 listens for signals transmitted from the BTSs 31–33. When an LMU receives a signal from a BTS, the LMU 35–37 determines the time of arrival of the arriving signal. This type of TOA measurement, (where an LMU measures the arrival time of a signal from a BTS) is referred to herein as TOA*. Each LMU then forwards the TOA* information to the MLC 39 using a suitable communication link (e.g., a hard-wired or wireless communication link). This communication link may operate using the same protocol as the handset being located (e.g., an AMPS communication link may be used when locating an AMPS protocol handset). The TOA* measurements enable the MLC 39 to compensate for any real-time difference between the transmission frames of the various BTSs 31–33. The MLC 39 then determines the location of the mobile device 30 using the downlink algorithm based on the TOA measurements and σs received from the mobile device 30, the TOA* measurements received from the LMUs 35–37, and the known location of the LMUs and BTSs.

Figure 4A:
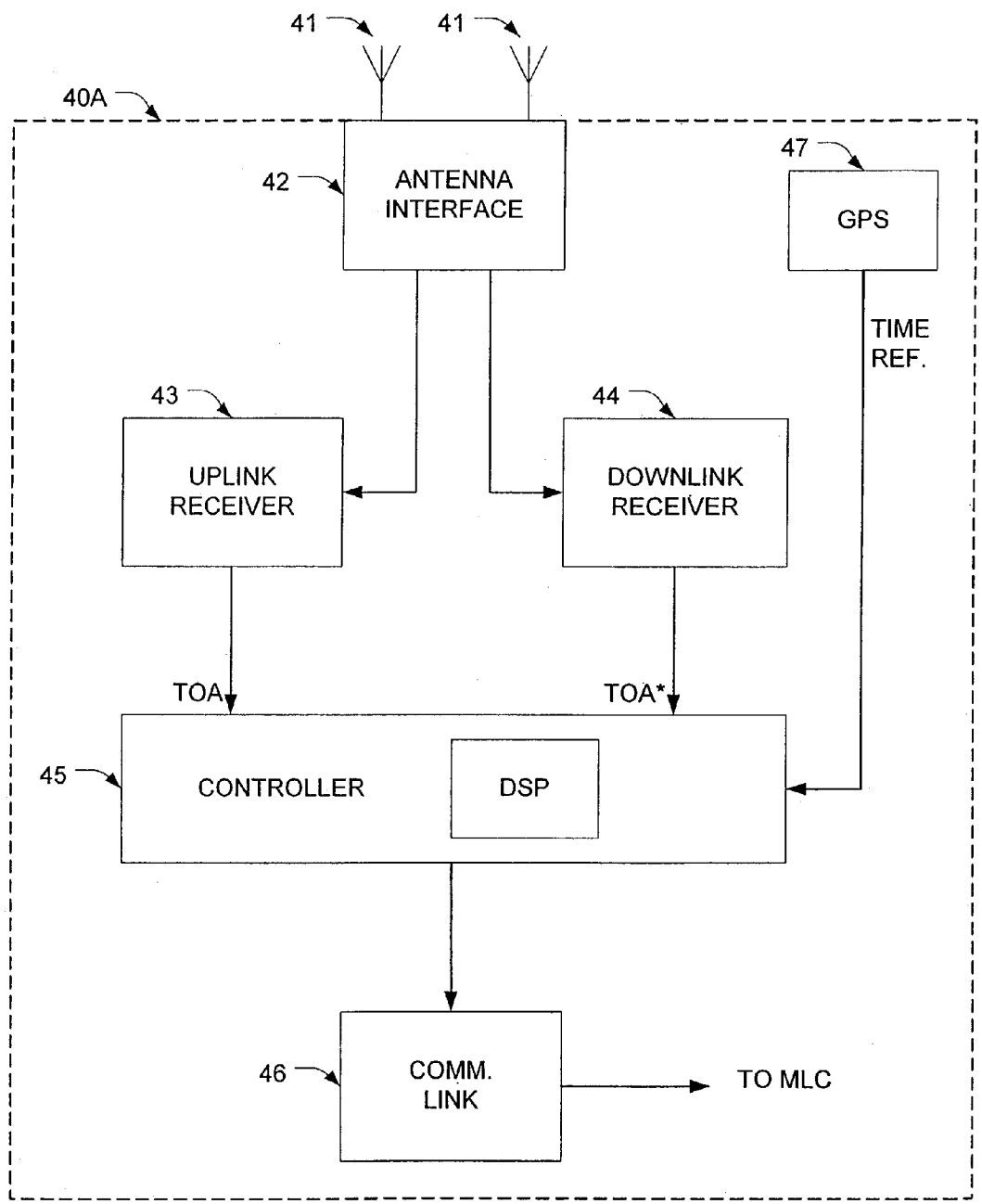
FIG. 4A is a schematic illustration of a first type of LMU that may be used in connection with the FIG. 3 embodiment.

FIG. 4A is a schematic illustration of a dual-mode uplink/downlink LMU 40A that may be used as any of the LMUs 35–37 in the FIG. 3 embodiment. The LMU 40A includes an antenna interface 42, which interfaces with one or more receiving antennas 41. It also includes an uplink receiver 43 designed to receive signals arriving from the mobile devices that are to be located (such as RACH bursts), and a downlink receiver 44 designed to receive signals arriving from a BTS (such as BCCH signals). A communication link 46 that interfaces the LMU 40A with a remote MLC (not shown) is also provided. Preferably, the operation of the LMU 40A is controlled by a controller 45.

Signals arriving from both mobile devices and BTSs are picked up by the antennas 41, and received by the appropriate receiver 43 (for mobile device signals) and 44 (for base station signals). The uplink receiver 43 and downlink receiver 44 cooperate with the controller 45 to note the time of arrival of the respective arriving signals. Recognizing when a signal has arrived at the uplink receiver 43 from a mobile device may be accomplished using conventional uplink control techniques. Similarly, recognizing when a signal has arrived at the downlink receiver 44 from a BTS may be accomplished using conventional downlink control techniques. Optionally, the controller 45 may rely on digital signal processing (DSP) to implement these control functions.

Once a TOA for each arriving signal has been determined, the controller 45 forwards the determined TOAs to a remote mobile location center (MLC) via communication link 46. This communication link 46 may be implemented using any suitable technique including, for example, wired interfaces (e.g., over standard telephone lines) as well as wireless interfaces (e.g., over the same network being used to communicate with the mobile device).

In uplink mode, the TOA measurements made by the system must be aligned with respect to a common frame of reference in order for the MLC to form an accurate location estimate. A convenient way of providing such a common frame of reference is to incorporate a global positioning satellites (GPS) receiver 47 in each LMU 40A, and to reference each TOA measurement reported to the MLC with respect to a received GPS time.

Figure 4B:
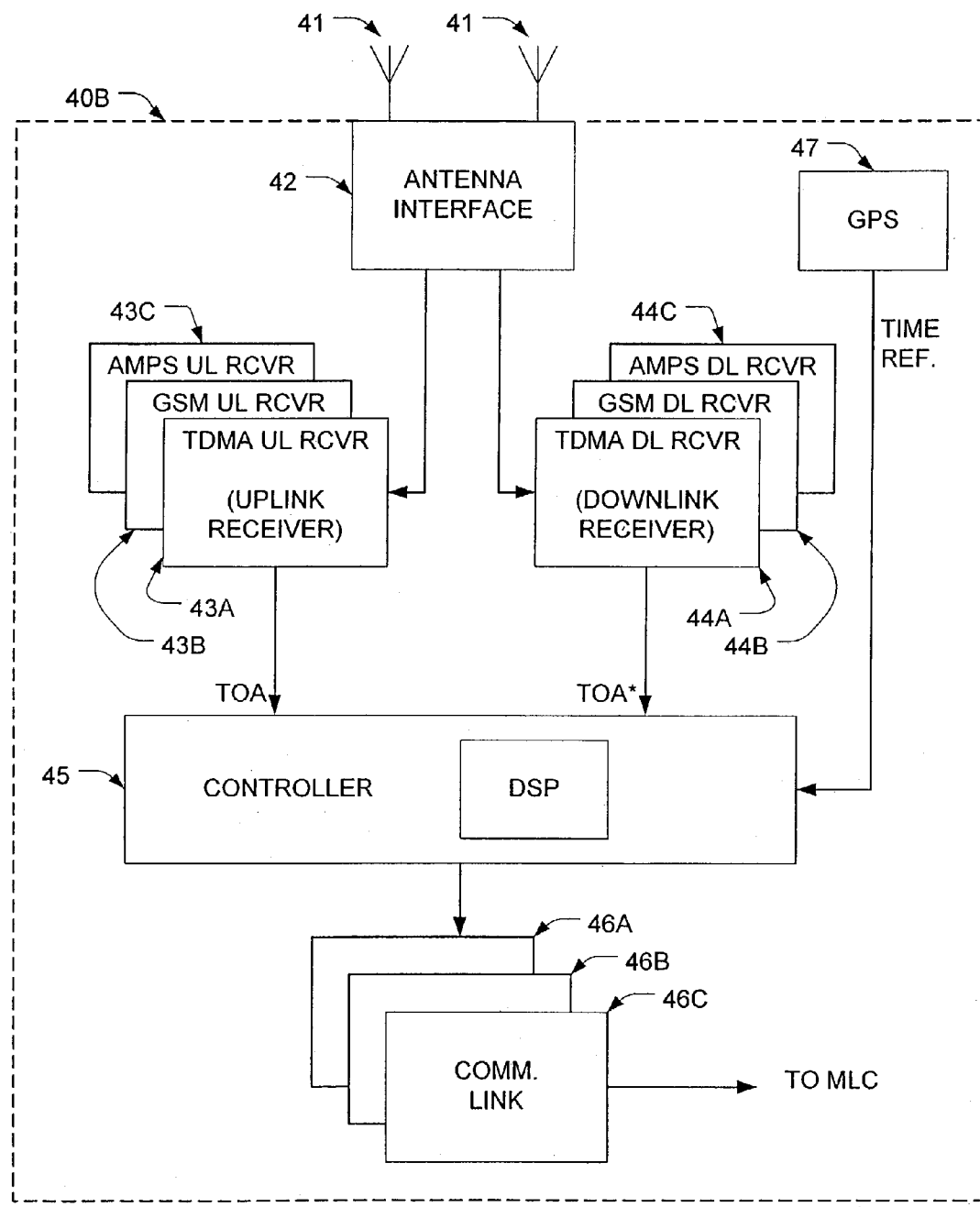
FIG. 4B is a schematic illustration of the first type of LMU, modified to support multiple wireless communication protocols.

FIG. 4B is a schematic illustration of another dual-mode uplink/downlink LMU 40B that may be used as any of the LMUs 35–37 in the FIG. 3 embodiment. This LMU 40B enables the FIG. 3 embodiment to locate handsets that communicate using different wireless communication protocols (such as ANSI-136 TDMA, GSM, AMPS, etc.), instead of being limited to a single communication protocol. The LMU 40B is similar to the LMU 40A (shown in FIG. 4A), except that the LMU 40B includes a plurality of uplink receivers 43A–43C, a plurality of downlink receivers 44A–44C, and a plurality of communication links 46A–46C (instead of one uplink receiver, one downlink receiver, and one communication link). Preferably, each of the uplink receivers 43A–43C is dedicated to a particular wireless communication protocol, and each of the downlink receivers 44A–44C is dedicated to a particular wireless communication protocol. Of course, while three uplink receivers and three downlink receivers are illustrated, a different number of receivers may be substituted to accommodate any number of different wireless communication protocols.

Preferably, each of the receivers 43A–43C, 44A–44C is implemented on an individual circuit card that can be plugged into a common backplane, and can be operated under control of a common controller 45. This arrangement lets each LMU operate for as many different wireless communication protocols as desired by plugging in additional receivers. Optionally, a separate communication link 46A–46C may be included for each wireless communication protocol. When separate communication links are provided, the same wireless network used to communicate with each handset can be used to forward the TOA measurements for that communication protocol to a remote MLC (e.g. an AMPS communication link for an AMPS handset, and a GSM communication link for a GSM handset). A separate MLC for each protocol may then be used to implement the location algorithms. When a single communication link is used for all the different communication protocols, a separate MLC may be used for each protocol, or a common MLC may be used for two or more communication protocols.

This arrangement, in which an LMU can make TOA measurements for different communication protocols, can be extended to uplink-only systems and downlink-only systems. For uplink-only systems, the block diagram would resemble FIG. 4B, but the downlink receivers 44A–44C would be omitted. For downlink-only systems, the block diagram would resemble FIG. 4B, but the uplink receivers 43A–43C would be omitted. Suitable modifications to the controller 45 should also be made so that the controller does not expect TOA measurements from a non-existent source.

Figure 5A:
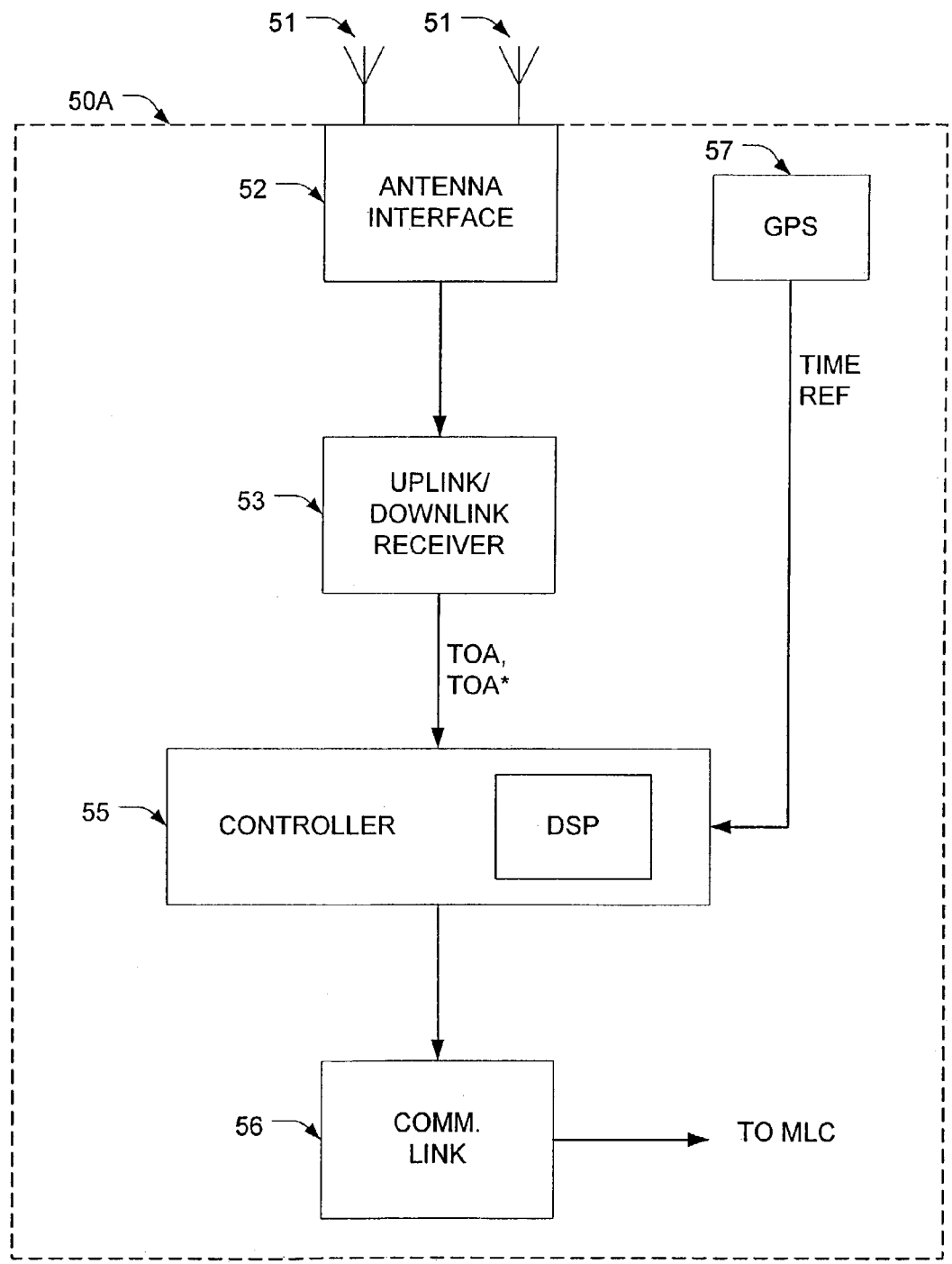
FIG. 5A is a schematic illustration of a second type of LMU that may be used in connection with the FIG. 3 embodiment.

FIG. 5A is a schematic illustration of another dual-mode uplink/downlink LMU 50A that may be used as any of the LMUs 35–37 in the FIG. 3 embodiment. This LMU 50A includes an antenna interface 52, which interfaces with one or more receiving antennas 51, and a combination uplink/downlink receiver 53 designed to receive signals arriving from the mobile devices that are to be located (such as RACH bursts) as well as signals arriving from a BTS (such as BCCH signals). A communication link 56 that interfaces the LMU 50A with a remote MLC (not shown) and an optional GPS receiver 57 are also provided. Preferably, the operation of the LMU 50A is controlled by a controller 55. Operation of the FIG. 5A embodiment is similar to the operation of the FIG. 4A embodiment described above, except that a single uplink/downlink receiver 53 is used in place of discrete uplink and downlink receivers (43 and 44, shown in FIG. 4A).

Figure 5B:
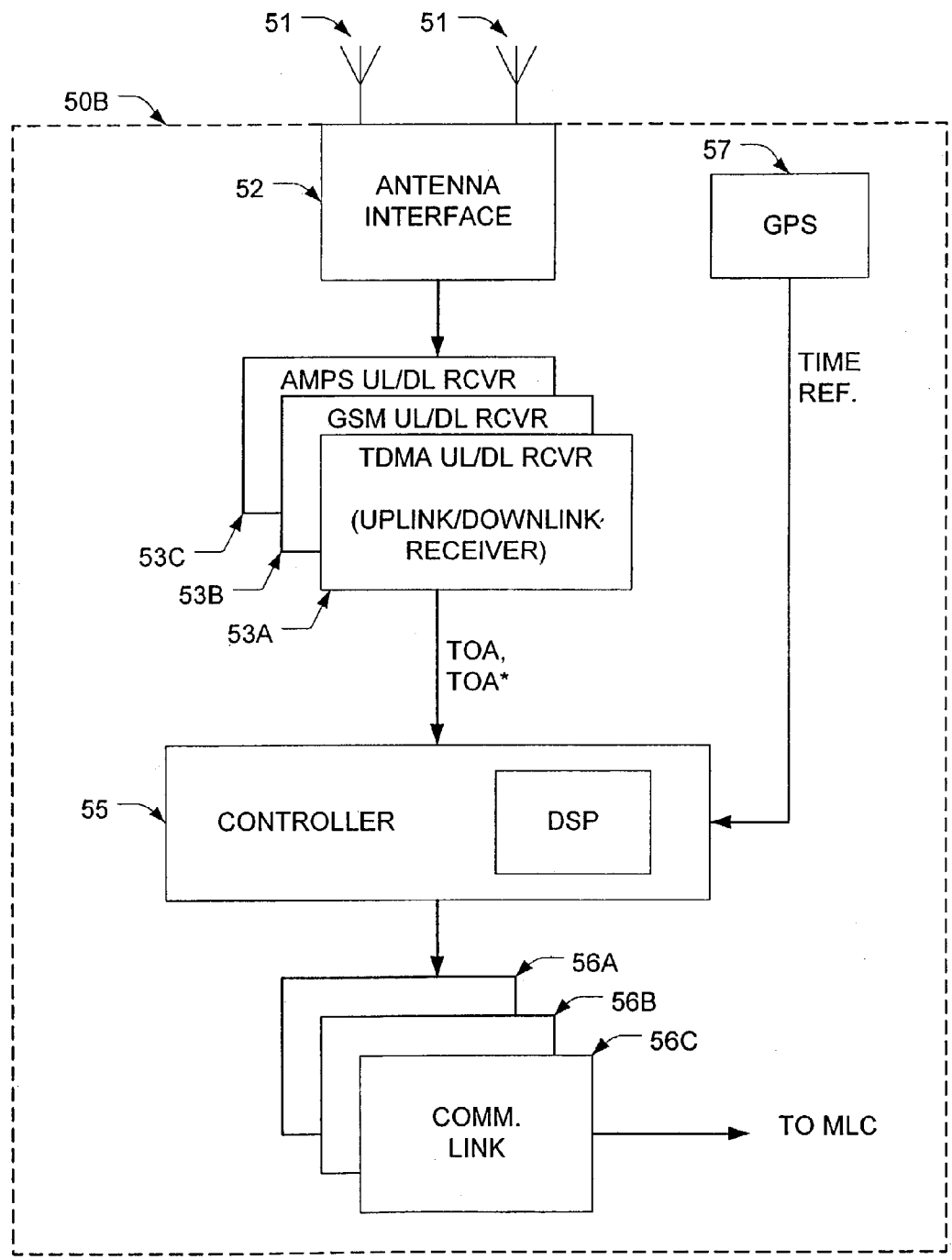
FIG. 5B is a schematic illustration of the second type of LMU, modified to support multiple wireless communication protocols.

FIG. 5B is a schematic illustration of another dual-mode uplink/downlink LMU 50B that may be used as any of the LMUs 35–37 in the FIG. 3 embodiment. This LMU 50B enables the FIG. 3 embodiment to locate handsets that communicate using different wireless communication protocols (such as TDMA, GSM, AMPS, etc.), instead of being limited to a single communication protocol. Operation of this LMU 50B is similar to the operation of the LMU 40B (shown in FIG. 4B), except that an integrated uplink/downlink receiver is used for each communication protocol instead of discrete uplink receivers and downlink receivers for each communication protocol.

Implementing both downlink and uplink algorithms in a single system enables the system to take advantage of the benefits of downlink, while avoiding downlink's shortcomings. More specifically, the dual mode location uplink/downlink system described herein lets a system operator add downlink handsets onto a communication network without adding extra capacity to the network by locating those handsets using the downlink mode. In addition, the uplink/downlink system described herein can be used to locate legacy handsets that do not support the downlink mode. When a location estimate for one of these legacy handsets is required, the system switches to the uplink mode, and processes the signals arriving from the handsets in order to determine the location of the handset. By using the downlink mode as the default location mode, and only switching to uplink mode for handsets that do not support the downlink mode, the amount of new network capacity that must be added can be kept to a minimum. Preferably, new handsets that are added to the wireless network will support the downlink mode in order to take advantage of the benefits provided by downlink.

The most popular conventional location algorithms operate by finding the intersection of two or more hyperbolas, where each hyperbola is determined by a pair of TOA measurements. In a single mode system, at least three TOA measurements are needed in order to obtain two pairs of TOA measurements (e.g., the pairs AB and AC can be formed from three measurements A, B, and C). When only one pair of TOA measurements is available in a single mode system, a location estimate can not be formed.

Figure 6:
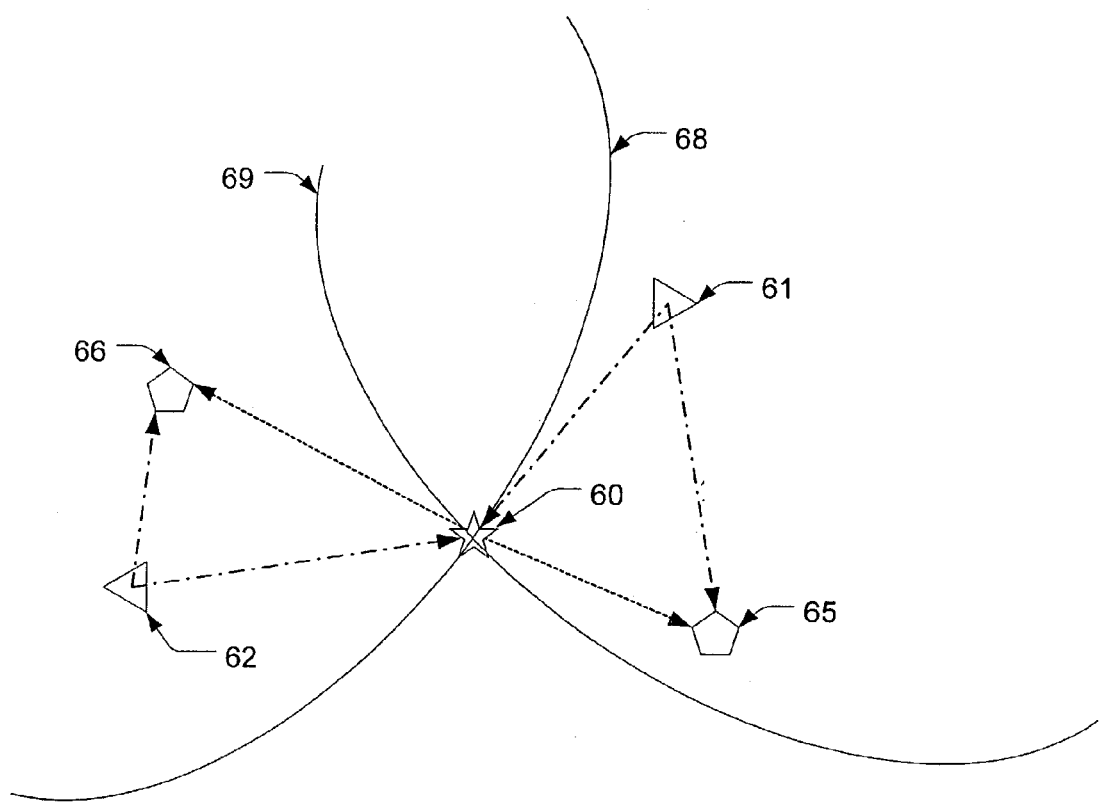
FIG. 6 is a schematic illustration of how data from uplink measurements and downlink measurements can be combined to form a location estimate.

When a dual mode system is available, however, a first hyperbola can be obtained from a pair of TOA measurements made using the uplink mode, and a second hyperbola can be obtained from a pair of TOA measurements made using the downlink mode. The intersection of these two hyperbolas can then be used as the estimate of the location of the mobile device. This is illustrated in FIG. 6, where a first hyperbola 68 is obtained using the uplink mode based on the TOA measurements of the signal from a handset 60 arriving at each of the LMUs 65, 66. A second hyperbola 69 is obtained using the downlink mode based on the TOA measurements of the signals from the BTSs. 61, 62 arriving at the handset 60, and the TOA* measurements of the signals from the BTSs 61, 62 arriving each of the LMUs 65, 66. The intersection of the hyperbolas 68, 69 is used as the location estimate. Providing a location estimate based on an uplink hyperbola 68 and a downlink hyperbola 69 could make the difference between obtaining an accurate location estimate and not obtaining one, when two hyperbolas cannot be obtained using a single link direction. Moreover, even when two hyperbolas are available from a single link direction (i.e., either uplink or downlink), the additional hyperbolas obtained by relying on both technologies simultaneously can be used to improve the accuracy of the resulting location estimate.

Providing a dual mode uplink/downlink location system in accordance with the above-described embodiments may also reduce infighting between the various players in the wireless industry by supporting both location architectures simultaneously. It can also help make location services available to the public more rapidly by insuring that investments in infrastructure for either technology will not be wasted.

Moreover, by combining multiple communication technologies in a single box, the number of new antenna sites needed to implement location services can be minimized. This arrangement should therefore minimize communities' resistance to the installation of the required infrastructure.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

What is claimed is:

1. A method of locating mobile devices, the method comprising:
    measuring times of arrival of an uplink signal from a first mobile device at each of at least three measurement units;
    computing a location of the first mobile device based on the measured times of arrival of the uplink signal;
    measuring at the at least three measurement units times of arrival of downlink signals from each of at least three base stations;
    receiving time of arrival measurements of the downlink signals from a second mobile device; and
    computing a location of the second mobile device based on the measured times of arrival of the downlink signals and the received time of arrival measurements from the second mobile device.

2. The method of claim 1, further comprising measuring times of arrival of the downlink signals at the second mobile device.

3. The method of claim 1, wherein computing a location of the first mobile device comprises implementing an uplink location algorithm and computing the location of the second mobile device comprises implementing a downlink location algorithm.

4. The method of claim 1, wherein computing a location of the second mobile device comprises:
    defining a first hyperbola based on the measured times of arrival of the at least three measurement units;
    defining a second hyperbola based on the received time of arrival measurements; and
    locating an intersection of the first hyperbola and the second hyperbola.

5. The method of claim 1, wherein the uplink signal comprises a random access channel signal.

6. The method of claim 1, wherein the downlink signal comprises a broadcast channel signal.

7. A method of locating a mobile device, the method comprising:
    determining at each of at least two measurement units times of arrival of an uplink signal from the mobile device;
    determining at the at least two measurement units times of arrival of downlink signals from each of at least two base stations;
    receiving from the mobile device time of arrival determinations for the downlink signals from the at least two base stations; and
    computing a location of the mobile device based on the determined times of arrival.

8. The method of claim 7, further comprising sending the determined times of arrival to a mobile location center and wherein computing a location comprises computing a location at the mobile location center.

9. The method of claim 8, wherein receiving the time of arrival determinations from the mobile device comprises receiving the time of arrival determinations from the mobile device at the mobile location center.

10. The method of claim 7, wherein computing a location of the mobile device comprises implementing an uplink location algorithm and implementing a downlink location algorithm.

11. The method of claim 7, wherein computing a location of the mobile device comprises:
   defining a first hyperbola based on the times of arrival of the uplink signal;
   defining a second hyperbola based on the times of arrival of the downlink signals; and
   locating an intersection of the first hyperbola and the second hyperbola.

12. The method of claim 7, wherein the uplink signal comprises a random access channel signal.

13. The method of claim 7, wherein the downlink signal comprises a broadcast channel signal.

14. A system for determining the location of a mobile device comprising:
   an uplink processor to implement an uplink location algorithm;
   a downlink processor to implement a downlink location algorithm;
   at least three base stations, located at known locations, to communicate with the mobile device; and
   at least three measurement units, having an uplink mode and a downlink mode,
   wherein, in the uplink mode, each of the measurement units determines a time of arrival of an uplink signal that originated from the mobile device and reports the determined time of arrival to the uplink processor, and the uplink processor determines the location of the mobile device using the uplink location algorithm based on the times of arrival reported to the uplink processor by the measurement units, and
   wherein, in the downlink mode, the mobile device determines times of arrival of downlink signals arriving from each of the at least three base stations and reports the determined times of arrival to the downlink processor, the measurement units collectively determine a time of arrival of downlink signals that originated from each of the at least three base stations and report the determined times of arrival to the downlink processor, and the downlink processor determines the location of the mobile device using the downlink location algorithm based on the times of arrival reported to the downlink processor by the mobile device and by the measurement units.

15. The system of claim 14, wherein the uplink processor and the downlink processor are implemented in the same processor.

16. The system of claim 14, wherein the uplink processor and the downlink processor are implemented in discrete devices.

17. The system of claim 14, wherein each of the measurement units includes a dual mode uplink/downlink receiver.

18. The system of claim 14, wherein each of the measurement units include a downlink receiver that is distinct from the uplink receiver.

19. The system of claim 14, wherein each of the measurement units determines times of arrival for signals corresponding to at least two different communication protocols.

20. The system of claim 19, wherein the at least two different communication protocols includes time division multiple access (TDMA) and global system for mobile communication (GSM) systems.

21. An apparatus comprising:
   a receiver to note a time of arrival of an uplink signal arriving from a mobile device at an unknown location, to forward the noted time of arrival of the uplink signal to an uplink processor, to note a time of arrival of a downlink signal arriving from a base station at a known location, and to forward the noted time of arrival of the downlink signal to a downlink processor.

22. The apparatus of claim 21, wherein the receiver comprises a uplink circuit card to note the time of arrival of the uplink signal and a downlink circuit card to note the time of arrival of the downlink signal.

23. The apparatus of claim 22, wherein the uplink circuit card and the downlink circuit card are plugged into a common backplane.

24. The apparatus of claim 23, further comprising a controller plugged into the common backplane to control the uplink circuit card and the downlink circuit card.

25. The apparatus of claim 23, wherein the uplink signal comprises a random access channel signal, and the downlink signal comprises a broadcast control channel signal.

26. The apparatus of claim 23, wherein the receiver determines times of arrival for signals corresponding to at least two different communication protocols.

27. The apparatus of claim 26, wherein the at least two different communication protocols includes time division multiple access (TDMA) and global system for mobile communication (GSM) systems.

28. The apparatus of claim 23, further comprising a mobile location center comprising:
   the uplink processor to receive the forwarded time of the arrival of the uplink signal and to implement an uplink location algorithm; and
   the downlink processor to receive the forwarded time of arrival of the downlink signal and to implement a downlink location algorithm.

* * * * *